US006637583B1

(12) United States Patent
Andersson

(10) Patent No.: US 6,637,583 B1
(45) Date of Patent: Oct. 28, 2003

(54) APPARATUS FOR CONVEYING AND FOLDING FLEXIBLE PACKAGING MATERIAL

(75) Inventor: Roland Andersson, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/009,524

(22) PCT Filed: May 17, 2000

(86) PCT No.: PCT/SE00/00975

§ 371 (c)(1),
(2), (4) Date: Dec. 11, 2001

(87) PCT Pub. No.: WO00/76885

PCT Pub. Date: Dec. 21, 2000

(30) Foreign Application Priority Data

Jun. 11, 1999 (SE) ............................................ 9902204

(51) Int. Cl.[7] ............................................ B65G 15/42
(52) U.S. Cl. .................................... 198/689.1; 198/400
(58) Field of Search ............................ 198/689.1, 400, 198/411

(56) References Cited

U.S. PATENT DOCUMENTS 3,708,058 A * 1/1973 Kalven .................... 198/689.1
3,799,541 A * 3/1974 Buccicone ........... 198/689.1 X
4,080,158 A * 3/1978 Kondo et al. ........ 198/689.1 X
4,295,737 A * 10/1981 Silverberg ........... 198/689.1 X
4,493,687 A 1/1985 Bernle
4,520,615 A 6/1985 Engler et al.
5,648,140 A * 7/1997 Vaders ................ 198/689.1 X
5,687,641 A * 11/1997 Williamson .......... 198/689.1 X
5,779,236 A * 7/1998 Duncan, Jr. et al. .. 198/689.1 X

FOREIGN PATENT DOCUMENTS

DE 3001531 * 7/1981 .............. 198/689.1
EP 0 255 261 2/1988
WO WO 93/23233 11/1993

* cited by examiner

*Primary Examiner*—James R. Bidwell
(74) *Attorney, Agent, or Firm*—Burns, Doane, Swecker & Mathis, L.L.P.

(57) ABSTRACT

The disclosure relates to an apparatus for conveying and folding flexible packaging material, comprising a conveyor (1) with a conveyor belt (3) which is provided with through-going holes and which, for a part of its length, extends substantially rectilinearly and with constant orientation along a suction box (9). By connecting the suction box (9) to a source of partial vacuum, a partial vacuum is created at the side of the belt facing towards the packaging material, which ensures that the packaging material is well-fixed and can thereby pass closely adjacent and be heated by a heating device (15) extending along the belt. The apparatus makes for concentrated, energy-efficient and well-defined heating of an edge region of the packaging material intended for thermosealing.

10 Claims, 1 Drawing Sheet

APPARATUS FOR CONVEYING AND FOLDING FLEXIBLE PACKAGING MATERIAL

TECHNICAL FIELD

Figure 1:
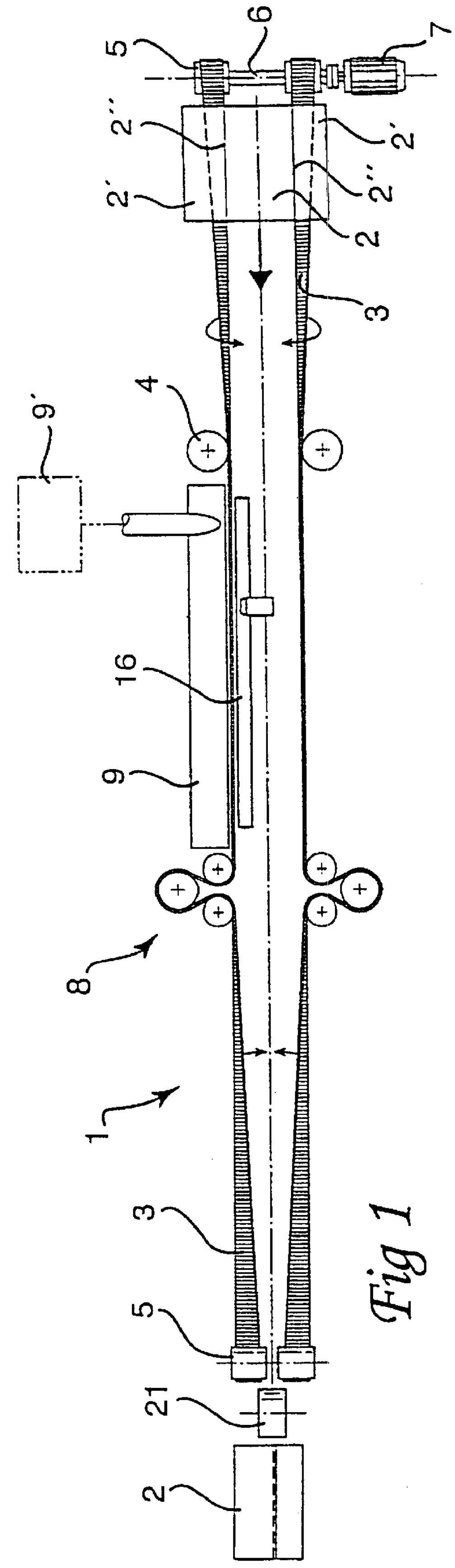

The present invention relates to an apparatus for conveying and folding a flexible packaging material, comprising a conveyor with conveyor devices which, along a section of the length of the conveyor, have gradually modified orientation.

BACKGROUND ART

In the production of packaging containers of various types, e.g. for packing liquid foods such as milk, juice or the like, use is often made of laminated material, a so-called packaging laminate consisting of layers of different material types. A common laminate material thus comprises a relatively thick core or carrier layer of fibre material, e.g. paper, which is coated on either side with thin layers of liquid-tight plastic material. The plastic material is normally of the thermoplastic type, i.e. a plastic type which can be sealed by heating and compression, which is utilised to seal the packaging material in connection with its conversion into packaging container blanks or finished packaging containers. The thermoplastic may, for example, be polyethylene or polypropylene. When necessary, the packaging laminate may also contain additional layers of, e.g. barrier material such as aluminium foil (Alifoil) or a per se known barrier plastic.

As a preparatory measure to the conversion of the packaging laminate into finished, filled and sealed packaging containers, a conversion often takes place of the original web-shaped packaging laminate into individual sheets or blanks in a special prefabrication operation. A typical blank for producing, e.g. gable top packages, consists, for instance, of a separate packaging laminate portion which, in a per se known manner, has been provided with a pattern of weakening or folding lines (crease lines) in order to make possible folding and reforming into a finished, gable top-fitted packaging container. In addition to the crease lines which are necessary to make for reforming of the top and bottom of the packaging container into finished form, the blank is provided with a number of parallel crease lines so as to convert the blank into sleeve or tube form of substantially rectangular cross section. This takes place in a prefabrication operation which comprises conveying the packaging container blank in the longitudinal direction of these crease lines and progressive folding of the outer panels defined by the crease lines so that these are each folded through 180° and with their outer, free side edges slightly overlapping each other. By heating the external thermoplastic material, a fusion or sealing thereafter takes place in this overlap zone which, after compression, forms a liquid-tight, longitudinal sealing joint or seam along the entire length of the packaging container blank. This pre-processing of the packaging laminate into individual, tubular and flat-laid packaging container blanks takes place at relatively high speed, at present typically of between 100 and 200 m/min. If the intention to further increase this production output speed, certain difficulties will arise as regards handling of the blanks, since conveying the blanks at even higher speed will result in instability which makes it difficult to obtain a uniform heating result satisfactory for the subsequent sealing operation.

At extremely high conveyor speeds, e.g. up towards 300 m/min, a rapid and intensive heating of the thermoplastic region which is to serve as the sealing zone is also necessary. In such instance, the temperature on heating must either be increased considerably, or the heating distance must be extended. At the same time, in order to obtain an acceptable degree of efficiency, a short distance is necessary between the heating device, e.g. a hot air nozzle, and the surface of the packaging material, which in turn necessitates extremely accurate guiding of the outer parts of the packaging container blank which, after folding, are to be sealed to one another. The method hitherto employed of heating the outer, longitudinal edge regions of the sheet before folding of the sheet has been commenced at all moreover proves to entail that the heated thermoplastic, during the folding phase, will have time to be cooled to such an extent that the subsequent seal will be of defective quality. This can partly be avoided in that the two panels which are to be heated are first folded to a 90° angle with the remaining panels and thereafter heated, whereafter the remaining 90° folding is finally undertaken and the overlapping panels are compressed together and sealed. With this technology, the distance and time between heating and sealing will be reduced, which increases the possibility for a fully adequate seal even at high conveyor speeds. However, this stepwise method further renders the guiding of the panels more difficult in connection with the heating operation, and trials employing support rollers and the like have merely resulted in the edges of the blank which are to be heated having an undulating appearance, with consequential uneven heating. Since, because of the inherent flexibility of the panels, neither is it possible to reliably be able to guide them in the immediate vicinity of the discharge surface of the hot air nozzle, heat losses will be great at the same time as the heated region will have an uneven and undefined contour.

Thus, there is a general need in the packaging or conversion technology to realise an apparatus for conveying and folding flexible packaging material which makes it possible, in connection with the folding at high speed, to effectively guide and heat the longitudinal free edge regions of a blank in such a manner that, with minimum losses, a uniform and well-defined heating region is obtained which, after supplementary folding together of the edge regions of the blank may be utilised for thermosealing of the overlapping edge regions, for the formation of a liquid- and possibly gas-tight seal extending along the blank.

OBJECTS OF THE INVENTION

One object of the present invention is to realise an apparatus for conveying and folding flexible packaging material, the apparatus making it possible, in a reliable and well-defined manner, to heat a longitudinal edge region of a packaging container blank at the same time as this is conveyed with high precision and at high speed, and is folded and sealed for the formation of a longitudinal seal.

A further object of the present invention is to realise an apparatus of the above-mentioned type, the apparatus being capable of conveying the blank in such a manner that the edge region intended for heating is guided rectilinearly along a well-defined path adjacent a heating device.

Yet a further object of the present invention is to realise an apparatus of the above-mentioned type, the apparatus making it possible, with minimum thermal or friction losses, to reliably guide and heat the edge region of the blank.

Still a further object of the present invention is to realise an apparatus of the above-mentioned type, the apparatus making it possible to guide the blank in such a manner that the edge of the blank will, to the greatest possible extent, remain planar and freely accessible for heating, folding or other processing.

Yet a further object of the present invention is to realise an apparatus of the above-mentioned type, the apparatus being particularly suitable for high production speed, being simple to manufacture and maintain and not suffering from the drawbacks which are inherent in prior art constructions.

Solution

The above and other objects have been attained according to the present invention in that an apparatus of the type described by way of introduction has been given the characterizing features as set forth in the characterizing clause of the appended main claim.

Preferred embodiments of the apparatus according to the present invention have further been given the characterizing features as set forth in the appended subclaims.

Advantages

By providing the apparatus according to the present invention with a perforated belt and a partial vacuum device which extends substantially along all of that part of the belt which runs with unchanged orientation immediately adjacent the hot air nozzle, it will be possible, on the one hand, to increase the precision in the guiding of the edge region of the blank, and, on the other hand, to ensure that the blank remains planar so that the edge region can thereby be led in immediate conjunction with the nozzle. As a result, thermal losses are reduced at the same time as a well-defined heating zone is obtained. In that the holes have different surface areas on both sides of the belt, maximum suction effect on the blank will be obtained at the same time as the suction effect does not create unnecessarily large friction between the rear side of the belt and the work surface of the suction box. It is also possible to provide the suction box with a coolant duct which further reduces heating of the belt. The apparatus according to the present invention thus hereby makes it possible, at high speed and with great precision, to realise a satisfactory and well-defined heating of the longitudinal edges of packaging container blanks which are to be thermosealed in a longitudinal sealing joint.

BRIEF DESCRIPTION OF THE ACCOMPANYING DRAWINGS

Figure 2:
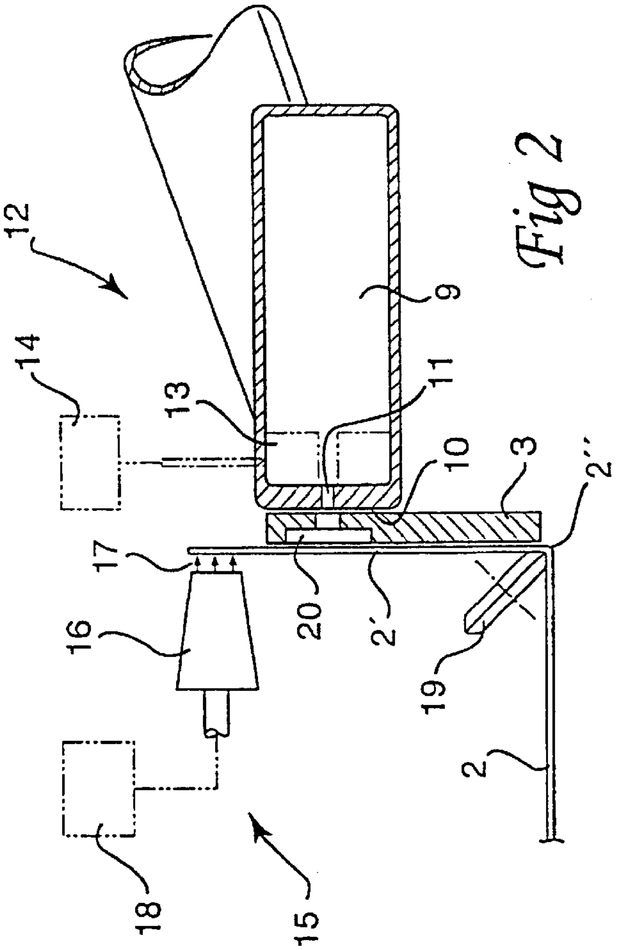

One preferred embodiment of an apparatus according to the present invention will now be described in greater detail hereinbelow, with particular reference to the accompanying Drawings, which show only those parts and details essential to an understanding of the present invention. In the accompanying Drawings:

FIG. 1 is a schematic top plan view of an apparatus according to the present invention; and FIG. 2 shows a section through a part of the apparatus according to the present invention illustrated in FIG. 1.

DESCRIPTION OF PREFERRED EMBODIMENT

The apparatus shown in the Figures constitutes a part of a conversion plant for packaging material, i.e. a per se known plant for converting packaging laminate in web form into tubular packaging container blanks which, in a filling machine, may simply be ready-formed, filled and sealed. The apparatus according to the present invention is thus preceded by some form of sheet feeder which, e.g. from a magazine discharges one blank at a time to the conveyor apparatus. After the apparatus according to the present invention, there is correspondingly some type of magazine for taking care of and storing the now folded, tubular packaging container blanks. This is a well-known technique which need not be described in greater detail in this context.

The apparatus according to the present invention comprises a conveyor 1 which extends between a magazine for unfolded sheets to a magazine (not shown) for double-folded, sealed and (rectangular) tubular packaging container blanks 2. The conveyor includes one or more conveyor belts 3 which run substantially parallel and with their active parts supported by one or more support rollers 4. Depending on the nature of the conveyed packaging material (sheet, web, width, thickness, rigidity etc.), the desired number of conveyor belts (possibly provided with carriers) can be utilised. In addition to the laterally located belts 3 which are shown, for example one or more centrally located, planar running belts may also advantageously be employed for ensuring uniform driving. Other drive means are conceivable, e.g. driving rows of rubber wheels or the like. However, this is a well-known feature within the area of conveying engineering and will not therefore be described and illustrated in greater detail in this context. At both ends of the conveyor 1, there is a number of per se known bending rollers 5 over which run the belts 3. At one part of the conveyor 1, the bending rollers 5 are driven via a drive shaft 6 by a suitable prime mover 7, e.g. an electric motor of known type. Along the conveyor 1, there may be further a large number of support rollers 4 or other types of rollers, as well as various devices for facilitating and ensuring a correct conveyance and folding of the packaging container blanks 2. However, such devices constitute technology which is well known in the art and are not, therefore, likely to need a detailed description in this context.

As is apparent from FIG. 1, each conveyor belt 3 runs from a bending roller located at the right-hand end of the conveyor 1 in FIG. 1 to a correspondingly disposed bending roller 5 at the left-hand end of the conveyor. During displacement from right to left end, a 180° rotation takes place around the longitudinal axis of the conveyor belt 3, which more precisely takes place stepwise in that the belt 3, during its displacement from the right-hand bending roller 5 where the belt runs substantially horizontally to the subsequent support roller 4 is rotated through 90° so that the belt, when it abuts against the support roller 4, is substantially in the vertical position, as is also illustrated in FIG. 2. Between the support roller 4 and an adjustable roller unit 8, the belt 3 extends with substantially unchanged, vertical orientation. After having passed the roller unit 8, a progressive, supplementary 90° rotation of the belt takes place so that, when it reaches the bending roller 5 located at the left-hand end of the conveyor 1, it once again substantially displays horizontal orientation, but is now rotated through 180° compared with the horizontal orientation at the right-hand end or infeed end of the conveyor. The stepwise rotation or change in orientation of the belt 3 thus takes place, on the one hand, between the bending rollers 5 and the support roller 4 in the proximity of the infeed end of the conveyor 1, and, on the other hand, between the roller unit 8 and the bending rollers 5 at the discharge or output end of the conveyor 1. The roller unit 8 makes it possible to support and control the movement of the belt in an efficient manner without the support rollers needing to abut against the active inside of the belt, i.e. that part of the belt which is in contact with blanks 2 conveyed through the conveyor 1. The roller unit 8 is displaceable in the longitudinal direction of the conveyor 1 in order to make for adjustment of the folding section of the conveyor. The support rollers 4 can naturally also be replaced by the roller unit 8 if this proves to be appropriate.

Between the roller unit 8 and the support roller 4, the apparatus according to the present invention displays a suction box 9 which is connected to a per se known, schematically indicated source 9' of partial vacuum of known type. The suction box 9 has a planar work surface 10 which is turned to face towards the belt 3 and includes at least one slot-shaped recess 11 (or alternatively a row of holes), which connect the inside of the suction box 9 with the ambient air. The suction box 9 may also be provided with a cooling device 12 which includes one or more coolant ducts 13 which are located in the proximity of the work surface 10 and which, in a suitable manner, are in communication with a schematically illustrated coolant fluid source 14 of per se known type, e.g. a coolant water tank.

As is apparent from FIG. 2, the belt 3 is provided with a number of through-going holes 20 which are intended to transfer partial vacuum from the slot 11 of the suction box 9 to the active surface 3 of the belt in order there to retain the portion 2' of the packaging container blank 2 abutting against the active surface of the belt. As will also be apparent from FIG. 2, the holes 20 are designed such that their area is greatest at the active side of the belt 3 which is turned to face away from the suction box 9. Preferably, the holes 20 have, at the active surface of the belt 3, a greater diameter than the diameter at the rear surface of the belt 3 facing towards the suction box 9, which, for example, maybe achieved in that the holes 20 have gradually modified diameter or possibly by means of conical or otherwise irregularly formed holes. It is also possible to replace the smaller holes located at the rear surface of the belt 3 with a narrow slit extending throughout the entire length of the belt, which may be advantageous in that it reduces the noise caused by the partial vacuum when the apparatus is in operation. This hole formation ensures that the partial vacuum supplied via the suction box 9 will have maximum effect at the active surface of the belt 3 while the increased abutment between the rear side of the belt 3 and the work surface of the suction box 9 caused by the partial vacuum is reduced to the greatest possible extent, which entails reduced friction losses and reduced heating of the belt at high operating speed.

At the opposite side of the belt 3 in relation to the suction box 9, the apparatus according to the present invention displays a heating device 15 which may, for example, be of per se known hot air type. The heating device 15 includes a nozzle 16 which leads heated hot air to that edge region of the packaging container blank 2 which is to be heated in order to make for subsequent thermosealing, as will be described in greater detail hereinbelow. The nozzle is located immediately adjacent the surface of the packaging container blank and is supplied with air from a conventional air source 18, e.g. some type of compressor. The air is preferably heated in the nozzle 16 which, in a per se known manner, is provided with heater elements in the form of an electric resistor wire which is connected to a suitable current source (not shown). The nozzle 16 is located immediately adjacent the surface of the packaging container blank 2 and is preferably of a length which is slightly shorter than the length of the suction box 9, i.e. fills out the greater part of the space between the support roller 4 and the roller unit 8 within which the belt 3 runs with unchanged, preferably vertical orientation. Further hot air nozzles may, naturally, be provided in order, for example, to heat other parts of the packaging container blank, for example the opposingly located outside of the longitudinal edge. Even if this edge is heated to a lesser extent than the first-mentioned edge (in order to avoid thermal damage to the decorative artwork side of the packaging material), it may also here be appropriate to guide the edge with a suction box of similar type. However, this is not shown in the Drawings.

It is finally also apparent from FIG. 2 how the inner corners of the packaging container blank 2 defined by longitudinal crease lines are supported with the aid of a number of fixing rollers 19 which are disposed in sequence and are placed at an angle in order to ensure a fixing of the packaging container blanks 2 in both the vertical and the horizontal directions. Additional fixing or support rollers may, naturally, also occur, but this is per se known within the art and, as a result, will not be described or shown in greater detail.

On operation of the apparatus according to the present invention, the flat-laid packaging container blanks 2 provided with crease lines will be fed from a magazine (not shown) in at the infeed end of the conveyor 1, i.e. the right-hand end illustrated in FIG. 1. In such instance, the packaging container blank 2 will pass the two bending rollers 5 driven by means of the drive shaft and the prime mover 7 and over which the two conveyor belts 3 run in a horizontal position. In this instance, the crease lines 2" which are utilised for folding the packaging container blank 2 and which extend in the longitudinal direction of the packaging container blank will coincide with the mutually facing longitudinal edges of the conveyor belts 3. With the aid of the conveyor belts 3, which, together with possible other per se known drive means (not shown), are displaced by means of the prime mover 7 at an even speed (approx. 300 m/min) from right to left in FIG. 1, the both side panels 2' of the blank 2 will progressively be folded upwards to a position at a 90° angle to the central, unfolded region of the blank 2. In other words, the two side panels 2' will extend substantially vertically when they pass the support rollers 4. During this folding, the side panels 2' will, because of the inherent flexibility of the packaging material and resistance to folding, be urged against the work surface of the belt 3 facing towards the blank. However, when the belts 3 pass the support rollers 4, the active folding of the blank ceases, which increases the risk that the folded side panels 2' will lose contact with the belt 3 and, because of, for example, dynamic forces or air currents, be displaced with undefined orientation and position along the nozzle 16 of the heating device 15. This entails an uneven and uncontrolled heating pattern and, better to guide the side panels 2' during this important phase of the blank production, the suction box 9 is utilised in order, via the linear recess 11 which extends in the longitudinal direction of the apparatus, to put the side panel 2' of the packaging container blank 2 in contact with the source of partial vacuum 9'. More precisely, the outside of the side panel 2' abutting against the work surface of the belt 3 will, thanks to the holes 20, be sucked to fixed abutment against the belt, at the same time as the belt 3, with its rear side, is sucked against the work surface 10 of the suction box 9. The belt 3 is preferably provided with a rear side of low friction material in order to avoid excessive friction and thereby heating of the belt 3. In order to optimise the suction of the packaging container blank 2 fast against the active surface of the belt 3 and at the same time minimise friction losses as a result of the abutment against the belt 3 and the work surface 10 of the suction box 9, the fact that the holes 20 are, according to the invention, of greater diameter at the belt surface facing away from the suction box 9 is also utilised, this, for example, having been realised in that the holes are conical or display stepwise modified diameter. Hereby, the partial vacuum will have maximum effect at that side of the belt facing towards the packaging container blank 2 and ensure a reliable abutment between the work surface of the belt 3 and the folded side panel 2' of the packaging container blank 2.

The differentiation of the suction force realised as a result of the varying size of the holes 20 at the front and rear surface, respectively, of the belt 3 results in the side panels 2' being fixed extremely accurately in the desired and substantially planar position during the passage of the belt 3 between the support roller 4 and the roller unit 8, which makes it possible to ensure a stable movement of the side panels 2' so that the distance between the work surface of the nozzle 16 and the adjacent surface of the side panel 2' which is to be heated can be very slight, typically of the order of between 0.5 and 2 mm. As a result, a well-defined heating and minimum thermal losses will be ensured, since the short distance entails that the necessary, rapid heating of the quickly passing blanks 2 will take place with relatively slight consumption of hot air. The accurate guiding also makes it possible to employ some form of retro-suction system, e.g. an ejector nozzle similar to that type which is illustrated in European Patent EP 436.085, which further optimises energy consumption so that losses can be kept to a minimum. The absence of rollers or other unevenly distributed pressure forces on the side panel 2' during the heating phase also ensures that this retains its planar state, which is necessary for a well-defined and efficient heating.

When the packaging container blank 2 has passed the hot air nozzle 16 and the suction box 9, its edge regions located along the side panels 2' have been heated to a thermoplastic temperature suitable for sealing. Immediately once the blank 2 has passed the roller unit 8, the remaining 90° folding of the blank takes place in that the conveyor belts 3 progressively rotate to a horizontal position when they pass the bending roller 5. Immediately after the bending roller 5, a per se known squeezer roller 21 will compress the now overlapping edge regions of the side panels 2' so that a durable and liquid-tight (or alternatively gas-tight) longitudinal sealing joint or seam is created. The thus folded, sealed and now flat-laid tubular packaging container blank 2 is thereafter transferred to a magazine (not shown) or is taken care of by other suitable means.

With the aid of the apparatus according to the present invention, it will thus be possible, during simultaneous conveying and folding of a flexible packaging container blank, to ensure an accurate and energy-efficient heating of the edge regions immediately before they are utilised for thermosealing so that the blank will have substantially rectangular tubular form. The accurate and rectilinear guiding of the side panel 2' of the blank 2 in connection with the heating operation permits high working speed and small thermal losses. The employment of a vacuum belt makes it possible to avoid the use of support rollers, guides or the like which partly run the risk of deforming the blank and partly impede the placing of the hot air nozzle. The fact that the holes 20 in the belt 3 are of different sizes or cross sectional area at the opposing surfaces of the belt 3 ensures, on the one hand, a steady fixing of the packaging container blank 2 to the active side of the belt 3 and, on the other hand, minimum friction losses because of the abutment between the rear side of the belt 3 and the work surface 10 of the suction box 9. This construction is particularly suitable in lengthy contact between belt and suction box, e.g. when the suction box, because of high working speed, must be made relatively long in length. At extremely high speeds, it may also be necessary to cool the belt and the work surface 10 of the suction box 9, which, as was previously described, takes place with the aid of coolant ducts 13 which are disposed immediately adjacent the work surface 10 and may be placed in communication with the source of coolant fluid 14.

By dividing the folding sequence into a first 90° folding, heating and also a subsequent 90° folding, numerous advantages will be afforded. First, the heating will, in terms of time, be closer to the subsequent sealing operation, which entails that the cooling distance will be shorter and less heat need be supplied. Secondly, it will be possible to utilise the inherent springiness of the material to improve the guiding of the folded side panels and their abutment against the belt in the heating zone, which makes it possible to leave that side of the panel which is to be heated free of guides or drive means, e.g. rollers. This has not previously been possible when heating took place with the packaging material in the planar state.

In an alternative embodiment of the apparatus according to the present invention, both of the belts 3 may naturally be divided up in such a manner that, for example, each belt 3 consists of three different belts, e.g. one for the first distance between the bending roller 5 at the infeed end of the conveyor 1 and the support roller 4, one for the distance between the support roller 4 and the roller unit 8, and also one for the distance between the roller unit 8 and the bending roller 5. In such instance, the design may possibly be made more economical in that only the belt extending between the support roller 4 and the roller unit 8 need be provided with holes 20 according to the invention. One or more of the remaining belts may also naturally be replaced by guides or some other form of guiding/folding device, e.g. rollers or the like. If the blank 2 is only to be double folded along a centrally located, longitudinal crease line, it is naturally also possible, in principle, to halve the apparatus according to the present invention, i.e. only one longitudinal belt 3 need be used, since the opposite side can be replaced by guide rollers or the like which keep the blank in the correct position during the folding and heating phases.

Finally, it should be observed that the apparatus according to the present invention may naturally also be employed for guiding packaging material in other types of processing than heating and sealing, e.g. on mechanical edge processing or in printing.

The present invention should not be considered as restricted to that described above and shown on the Drawings, many modifications being conceivable without departing from the scope of the appended Claims.

What is claimed is:

1. An apparatus for conveying and folding flexible packaging material, comprising:

- a conveyor with conveyor devices which, along a section of the length of the conveyor, have gradually modified orientation for changing the orientation of the packaging material;
- a conveyor belt which, along a part of the length of the conveyor, extends substantially rectilinearly;
- a suction box disposed along the conveyor belt which, at its side facing towards the belt, has a recess communicable with a source of partial vacuum, the belt including through-going holes to transfer the partial vacuum from said recess to the opposite side of the belt in order to retain the packaging material conveyed thereon by means of the belt.

2. The apparatus as claimed in claim 1, wherein the cross sectional area of the holes is at its greatest at that side of the belt which is turned to face away from the suction box.

3. The apparatus as claimed in claim 1, wherein the holes at the belt surface facing away from the suction box are of greater diameter than at the belt surface facing towards the suction box.

4. The apparatus as claimed in claim 3, wherein said holes are conical.

5. The apparatus as claimed in claim 1, wherein said holes have gradually modified diameter.

6. The apparatus as claimed in claim 1, wherein a heating device for blanks conveyed by means of the belts is disposed along the suction box.

7. The apparatus as claimed in claim 6, wherein the belt extends between the suction box and the heating device.

8. The apparatus as claimed in claim 1, wherein a coolant duct is disposed between the suction box and the belt.

9. The apparatus as claimed in claim 1, wherein the conveyor includes two belts whose mutual orientation changes mirror-reversed along the length of the conveyor.

10. The apparatus as claimed in claim 1, wherein the conveyor includes a plurality of sequentially disposed belts.

* * * * *